J. P. HEDSTROM.
CARRIAGE FOR GANG SAW SHARPENING MACHINES.
APPLICATION FILED JULY 15, 1909.

991,503.  Patented May 9, 1911.

WITNESSES:
Roy Wallis
Ralph S. Warfield.

INVENTOR
John P. Hedstrom
BY
Geo. B. Willcox
ATTORNEY

UNITED STATES PATENT OFFICE.

JOHN P. HEDSTROM, OF BIG RAPIDS, MICHIGAN, ASSIGNOR TO HANCHETT SWAGE WORKS, OF BIG RAPIDS, MICHIGAN, A CORPORATION OF MICHIGAN.

CARRIAGE FOR GANG-SAW-SHARPENING MACHINES.

991,503.  Specification of Letters Patent.  Patented May 9, 1911.

Application filed July 15, 1909. Serial No. 507,665.

*To all whom it may concern:*

Be it known that I, JOHN P. HEDSTROM, a citizen of the United States, residing at Big Rapids, in the county of Mecosta and State of Michigan, have invented certain new and useful Improvements in Carriages for Gang-Saw-Sharpening Machines; and I do hereby declare the following to be a full, clear, and exact description of the invention, such as will enable others skilled in the art to which it appertains to make and use the same.

My invention relates to adjustable carriages for gang saw sharpening machines.

As is well known, gang saws are made in different lengths from 18 to 52 inches, and heretofore it has been necessary to provide separate carriages for each length of saw. Obviously, this vastly increased the expense and cost of a machine and as a result, dealers do not carry the machines in stock but only furnish them to order.

It is the object of my invention to provide an adjustable carriage capable of receiving saws of different lengths, and while it is possible to provide one carriage which will accommodate saws of all lengths from the smallest to the largest, I have found it more practicable to provide, say three carriages, each of which will accommodate saws throughout a certain definite range of length, the carriages being similar to each other save only in respect to size, and hence a description of one will suffice for all.

Another object of my invention is to provide an adjustable gang saw carriage which can be easily and quickly placed in position, or removed from the machine, and in which the adjustment desired can be easily and quickly effected.

To these and other ends, therefore, my invention consists in certain novel features and combinations such as will be more fully described hereinafter and particularly pointed out in the claims.

Figure 1:
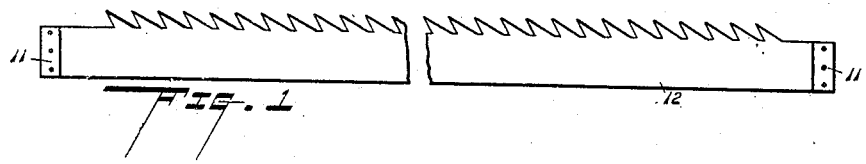
Figure 2:
Figure 3:
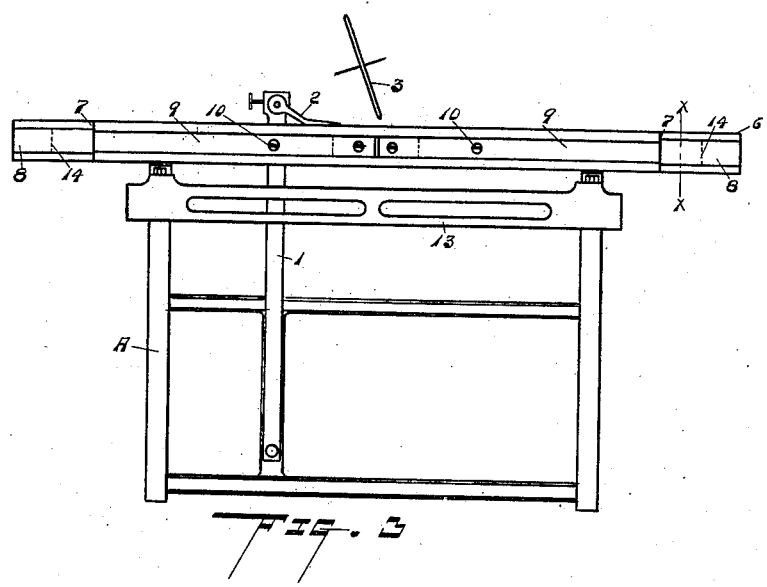
Figures 4, 5:
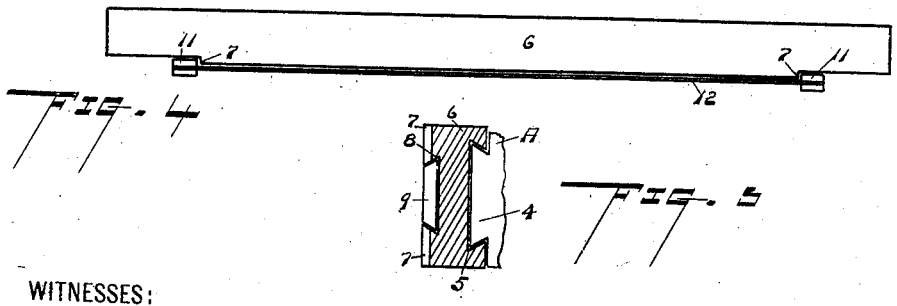

In the accompanying drawings, Figure 1 is a side view of a gang saw, Fig. 2 is an edge view thereof, Fig. 3 is a side view of a machine equipped with one embodiment of my invention, Fig. 4 is a top plan view of a carriage removed from the machine, and Fig. 5 is a cross-sectional view on line *x—x* of Fig. 3.

A indicates the frame of the usual saw sharpening machine, provided with the feed lever 1, the feed finger 2, and the grinding wheel 3. The frame A is provided preferably along one upper side bar with an under-cut rail 4, adapted to be received in a dove-tailed groove 5 formed in the rear face of the saw carriage 6, it being understood that the carriage may be slidably mounted on the frame A in any other convenient manner.

The upper face of the carriage is reduced at its opposite ends to form shoulders 7, 7, spaced apart from each other, the distance between the shoulders determining the minimum length of gang saws which can be accommodated by the carriage.

The outer side face of the carriage is also provided with a groove 8 extending from end to end thereof and preferably under-cut or dove-tailed as shown.

At least one slide 9 is received in the way 8, and in the accompanying drawings I have shown two such slides received within the way. The combined lengths of the slides should be no greater than the distance between the shoulders 7, 7, and the slides when not in use, are fastened against movement in the ways by means of the counter-sunk set screws 10, 10, or held against movement in any other suitable manner. An inspection of Fig. 5 will show that the thickness of the slide 9 is at least equal to the depth of the way 8 and consequently, when the slides, whose outer ends normally lie in line with the shoulders 7, 7, are slid apart end wise to accommodate saws of greater length than the distance between the shoulders 7, 7, the ends of the slides will form adjustable shoulders against which the tabs 11, 11, on the saws 12, 12, may take.

The saw is placed with its side face resting against and parallel with the outer face of the carriage, the saw being held in such position in any suitable manner as by the clamping plate 13, it being observed that the outer face of the slide 9 lies in the same vertical plane with the outer face of the unreduced, ungrooved portion of the carriage 6.

From the foregoing it is obvious that the shortest length of saw which the carriage can accommodate, will be determined by the distance between the shoulders 7, 7, the longest saws being accommodated on the carriage by merely loosening the set screws 10, forcing the slides apart until the outer ends of the slides lie apart from each other a distance equal to the distance between the inner edges of the tabs 11, 11 of the saws. In Fig. 3, the dotted lines 14 indicate the positions assumed by the outer ends of the slides when the latter are set to accommodate saws of greater length than the distance between the shoulders 7, 7. It is obvious that one slide only can be used, the tab on the opposite end of the saw taking against the shoulder 7 farthest from the outer end of the slide 9.

Changes might be made in the form and arrangement of the several parts described without departing from the spirit and scope of my invention.

Having thus fully disclosed my invention, what I claim as new, is:—

1. The combination with a saw sharpening machine, of a carriage, at least one end of which is reduced to form a shoulder, the carriage being grooved, a slide adjustably received in the groove and adapted to project over the reduced portion of the carriage, the end of the slide extending beyond the face of the reduced portion of the carriage to form a shoulder adapted to be engaged by the tab of a gang saw, and means for releasably securing the slide in adjusted position.

2. The combination with a saw sharpening machine, of a carriage mounted thereon, the outer face of the carriage at opposite ends, being reduced to form shoulders, the carriage being provided with a groove, a slide adjustably received in the groove, the outer face of the slide lying in the same plane with the outer face of the unreduced portion of the carriage and adapted to extend past the shoulders, and means for securing the slides in adjusted position.

3. The combination in a saw sharpening machine, of a carriage mounted thereon, the outer face of the carriage at its opposite ends, being reduced to form shoulders located a fixed distance apart, the outer face of the carriage being provided with a groove extending longitudinally of the carriage from end to end thereof, a slide receivable in the groove, and means for adjustably securing the slide at any point throughout the length of the groove, the outer face of the slide lying in the same plane with the outer face of the unreduced portion of the carriage.

In testimony whereof, I affix my signature in presence of two witnesses.

JOHN P. HEDSTROM.

Witnesses:
H. J. HEYDENBURG,
E. D. SANFORD.

---

Copies of this patent may be obtained for five cents each, by addressing the "Commissioner of Patents, Washington, D. C."